Patented Oct. 1, 1946

2,408,654

UNITED STATES PATENT OFFICE 2,408,654

SILICIC ACID SOLS

Joseph S. Kirk, Seven Hills Village, Ohio, assignor to E. I. du Pont de Nemours & Company, Wilmington, Del., a corporation of Delaware No Drawing. Application April 18, 1942,
Serial No. 439,547

5 Claims. (Cl. 252—309)

This invention relates to silicic acid sols and is more particularly directed to processes for producing silicic acid sols in which silicic acid and an organic hydrogen bonding donor compound are brought into contact in water, whereby a complex of the hydrogen bonding donor compound and the silicic acid is formed, and the complex is separated from the excess water, and is further directed to substantially salt-free complexes of silicic acid with hydrogen bonding compounds thus produced.

Silicic acid sols and gels are ordinarily prepared by the treatment of an aqueous silicate solution with a suitable acid. As a usual thing, sodium silicate is treated with sulfuric or hydrochloric acid. Sols and gels thus prepared contain salts as impurities and additionally contain an excess of water. While considerably more expensive, silicic acid sols and gels can be prepared by the hydrolysis of silicic acid esters such as ethyl silicate or they may be prepared from silicon halides such as silicon chloride or silicon tetrachloride. Silicic acid sols, however prepared, set rather quickly to a gel. The usefulness of such sols is accordingly limited since for many purposes they must be freshly prepared at the time of use. The conversion of the silicic acid sol to a gel is accompanied by changes in physical and chemical properties, and difficulty is experienced in using such sols for any purpose in which these properties are at all critical.

Silicic acid sols are highly active chemically, and this property makes them poorly suited to some uses. Silicic acid sols are hardly suitable as tanning agents, for instance, because of their rapid and astringent action upon skins.

It is an object of the present invention to provide silicic acid sols of improved physical and chemical properties and to provide processes for their production. A further object is to provide silicic acid sols substantially free from salt impurities and containing only a limited amount of water and to provide processes for producing such sols. Another object is to provide processes in which silicic acid sols are salted out from water and impurities. Other objects of the invention will become apparent hereinafter.

The foregoing and other objects of this invention are accomplished by processes in which silicic acid and an organic hydrogen bonding donor compound are brought into contact in water, whereby a complex of the hydrogen bonding donor compound and the silicic acid is formed, and the complex is separated from the excess water. In a preferred process such separation is effected by salting out the complex as a phase separate from the phase containing excess water and salt and separating the two phases so formed.

The silicic acid sols formed by the inclusion of hydrogen bonding donor compounds have novel physical and chemical character. The sols are of increased stability. The sols are more suitable for paper coating, for instance, by reason of the presence of the hydrogen bonding agent, and their improved chemical and physical characteristics similarly increase their suitability for many purposes.

Hydrogen bonding is a concept advanced in recent years to explain certain abnormalities in the chemical and physical behavior of mixtures of compounds one of which contains hydrogen attached to a strongly negative radical and the other an atom capable of donating a pair of electrons to form a directional or coordination bond. Since the bond is formed by the donation of an electron pair from one atom, the donor, to the other atom, the bond is not of the type conceived of a; an ordinary valence bond but many of the properties of the mixture indicate that a type of chemical compound is formed. These mixtures, for instance, exhibit an abnormal vapor pressure lowering, that is, a deviation from Raoult's law. There is further observed abnormal heats of mixing and abnormal deviation in viscosity and freezing point lowering.

I have found that when silicic acid is mixed with an organic hydrogen bonding donor compound it exhibits characteristics unexplainable upon the basis of ordinary chemical reaction and unexpected from a consideration of the characteristics of the materials mixed. Apparently silicic acid has an acceptor hydrogen atom and forms some type of compound with a hydrogen bonding donor. Among the characteristics of these silicic acid-hydrogen bonding donor combinations is a decreased tendency to precipitate gelatin and an increase in the time required for the sol to be converted to the gel.

It will be understood that in advancing the theory of hydrogen bonding to explain the unexpected results of the present invention I do not intend to be limited or restricted by this theory. The theory may or may not be correct and for the purposes of the present invention it is of importance largely because, whatever the reason, the type of compounds known to be organic hydrogen bonding donors profoundly modify silicic acid sols and gels.

Silicic acid sols according to this invention are formed in aqueous solution and hydrogen bonding agents used should accordingly be water soluble at least to the slight extent required to permit formation of a coordination complex with silicic acid.

A hydrogen bonding donor should not contain groups which will react with silicic acid to give compounds or precipitates of the conventional sort when such reaction would interfere with the hydrogen bonding. It is further to be noted that while some hydrogen bonding agents produce water-insoluble complexes it is often preferred to use only those hydrogen bonding agents which do not lead to any type of precipitate.

The organic hydrogen bonding donor compounds used in the processes and compositions of this invention are preferably organic compounds which contain at least one oxygen atom bonded to a carbon atom and which are selected from the group consisting of ethers, amides, and ketones. Best results are obtained by using compounds of this class which are at least sparingly soluble in water, that is, soluble to the extent of one half per cent by weight. If it is desired to salt out silicic acid together with a hydrogen bonding agent according to a preferred practice of this invention the agent selected should be sufficiently insoluble in a concentrated aqueous solution of a salt, that is, a "brine," that at least a part of the hydrogen bonding agent will form a phase separate from the salt solution. It will be understood that the salt here referred to may be any suitable salt as more particularly described hereinafter, and that mixtures of hydrogen bonders may be used.

Ethers are among the most effective of hydrogen bonding agents for use with silicic acid according to the present invention. Donors of this class, in addition to containing an ether group, may advantageously contain an oxygen or nitrogen atom in addition to that in the ether linkage and may contain, say, an additional ether group, a hydroxy group, an amide group, or an ester group. The presence of these groups appears very beneficial. A number of such groups may be present and there may be used, for instance, poly-ethers which contain hydroxyl groups and ester groups.

As examples of ethers the following are listed:

Nonaethylene glycol
Dimethyl ether of tetraethylene glycol
Dimethyl ether of diethylene glycol
Hexaethylene glycol
Butyl ether of diethylene glycol
Ethyl ether of diethylene glycol acetate
Methyl ether of diethylene glycol acetate
Tetraethylene glycol
Monoethyl ether of diethylene glycol
Triethylene glycol
Monoethyl ether of ethylene glycol
N,N'-Bix(beta-methoxyethyl) adipamide
Polyethylene glycol adipate
Diethyl ether of diethylene glycol
Dioxane
Dioxalane
Diethyl ether of ethylene glycol
Dimethyl ether of ethylene glycol
Triethylene glycol dipropionate
N,N-Dimethylmethoxyacetamide
N,N'-Adipyldimorpholine
Dimorpholide urea
Polyethylene oxide The term "ether" will be understood to refer to organic compounds containing a carbon-oxygen-carbon group in which the carbon atoms attached to the oxygen are not directly attached to each other.

Polyethers obtained by the polymerization or interaction of ethylene oxide, propylene oxide, and the like with other organic substances are useful in modifying silicic acid by reason of ether groups which they contain. The following are examples of such reaction products:

Monomethyl ether of ethylene glycol-ethylene oxide reaction product
Ethylene glycol-ethylene oxide reaction product
Glycerol-ethylene oxide reaction product
Ethanolformamide-ethylene oxide reaction product Amides are among the preferred hydrogen bonding donors for use with silicic acid according to this invention. Whereas oxygen is the donor atom in ethers the nitrogen of amides probably acts as the donor atom. Among the most effective compounds of this group are the N-substituted amides and the di-substituted compounds are preferred.

Examples of amides are listed below, ureas and other amides being listed separately:

Ureas

Tetramethylurea
Tetraethylurea

Amides

N,N,N',N'-Tetramethyladipamide
N,N-Dimethylacetamide
N,N,N',N'-Tetramethylsuccinamide
N,N,N',N'-Tetraethylsuccinamide
N,N-Diethylacetamide
N,N,N',N'-Tetraethyloxamide
N,N-Diethylformamide
N,N-Diethylpropionamide
N,N-Diethylglycolamide
N-butyl-N-beta-hydroxyethyllactamide
N-isobutylacetamide
N-formylhexamethylenimine
Diethylcyanamide Ketones are among the effective hydrogen bonding agents for use with silicic acid according to the present invention. Donors of this class in addition to containing a keto group may advantageously contain an oxygen in addition to that in the keto linkage or a nitrogen atom, and may contain, say, an ether group, an amide group, or an ester group. The presence of these groups appears very beneficial. A number of such groups may be present.

As examples of ketones, the following are listed:

Acetone
Acetonyl acetone
Formacetoethyl ketone
Methyl acetoacetate
Diacetone alcohol
Diacetyl ketone Silicic acid sols which are separated out in conjunction with a hydrogen bonding donor according to a process of the present invention may be prepared according to any of the processes known to the art for the preparation of silica sols. In a typical process a sodium silicate solution is added with effective mixing to a solution of acid which contains a hydrogen bonding donor, the amounts of silicate and acid being so selected as to produce a silica sol. By effective mixing is meant that the reactants are brought together under conditions such that no substantial local concentration of one or the other is present at the point of mixing or thereafter.

It will be understood that any soluble silicate such as sodium, potassium, or ammonium silicate and any suitable acid such as sulfuric, sulfamic, hydrochloric, nitric, thionic, lactic, acetic, and the like may be used. Acidulous salts may similarly be used, and there may be employed, for instance, sodium bisulfate, monosodium phosphate, acid tartrates, zinc chloride, titanium sulfate, aluminum sulfate, and chromium sulfate. The amount of acid or acidic material will ordinarily be such as to result in a pH of about 1.0 to 5.0.

Silicic acid sols may be prepared in still other manners and they may be made, for instance, from silicic acid esters, partially hydrolyzed esters of silicic acid, and silicon halides. Typical of such methods of preparation are the following:

*From methyl silicate.*—Method described by Grimaux, Compt. rend. 98, 105 (1884); 98, 1434 (1884). According to my modification of this method, sols may be prepared by stirring methyl silicate with a sufficient quantity of water so that there are say 5 parts of $SiO_2$ per 100 parts of the mixture. The addition of sufficient acid to lower the pH to about 1 or 2 accelerates the rate of hydrolysis of the methyl silicate and increases the stability of the silicic acid in a low molecular weight state.

*From silicon tetrachloride.*—E. C. Williams, U. S. Patent 1,539,342. Silicon tetrachloride is stirred into water with agitation and in such proportion as to give a solution of silicic acid which gels on standing. One method of carrying out this reaction would be to run silicon tetrachloride in a thin stream into a slightly acidified mixture of water and ice until, for example, the mixture contains 4 per cent by weight of $SiO_2$. The excess acidity is then neutralized with alkali such as 20 per cent NaOH solution with violent stirring as the alkali is added, until a pH of 1 or 2 is reached.

*From silicon sulfide.*—Fleury, U. S. Patent 61,931. By stirring silicon sulfide with water, a solution of silicic acid can be obtained with the simultaneous evolution of hydrogen sulfide.

*By electro-osmosis of sodium silicate solution.*—Schwerin, U. S. Patent 1,132,394. A dilute solution of sodium silicate is subjected to electro-osmosis, the silicic acid being obtained as a soosmosis in the anode compartment.

*By the electrolysis of sodium silicate with a mercury cathode.*—N. L. Collins, U. S. Patent 1,562,940. By electrolyzing a solution of sodium silicate in a cell fitted with a lead anode and mercury cathode, there is obtained a solution of silicic acid. By adding a small quantity of salt, such as sodium chloride, to the solution just before hydrolysis, the stability of the silicic acid would be increased by virtue of the small amount of hydrochloric acid thereby formed at the anode.

The silicic acid sols used to form the complexes separated out according to the present invention are preferably formed in the presence of a hydrogen bonding agent, but if desired the hydrogen bonding agent may be added to a freshly prepared sol.

Polymerization starts to occur in silicic acid sols as soon as the sols are prepared and normally proceeds until a typical silica gel structure has been formed. According to the present invention, silicic acid-hydrogen bonder complexes are separated out before such polymerization has proceeded to completion. Compared with silica gels, the silicic acid in the sols to which the bonder is added has relatively low molecular weight, but it will be understood that the silicic acid does not need to be monomeric. It is ordinarily sastisfactory if the hydrogen bonder is added to a silicic acid sol in which the molecular weight of the silicic acid is not substantially greater than that in a silicic acid sol which does not exhibit evidence of gelling. Such gelling will be recognized by a decrease in pourability, an increase in apparent viscosity, an apparent lack of physical homogeneity, and other similar changes in the chemical and physical properties of the sol.

According to the present invention polysilicic acids obtained by procedures such as those above described and others are separated in conjunction with hydrogen bonding agents from excess water and salt impurities. The proportion of bonding agent to silicic acid sol used in any particular instance depends on such factors as the nature of the agent and its solubility in water and in brine, the molecular weight of the silicic acid, and the concentration of silicic acid in the sol used. A few simple tests with varying proportions of bonding agent will reveal the optimum proportion for the particular conditions employed.

The separation may be accomplished by any suitable method. The water may be distilled off, any hydrogen bonding agent lost by distillation with the water being replaced with a like quantity of water-free bonding agent. The distillation preferably should be carried out at relatively low temperatures to avoid accelerating the polymerization of the silicic acid, and this can be conveniently accomplished by distilling under reduced pressure, such as at an absolute pressure equivalent to from 25 to 50 mm. of mercury. The silicic acid-hydrogen bonder complex is recovered as an undistilled residue, associated with any non-volatile impurities, such as salt, originally present in the aqueous solution. Such impurities, if insoluble in the concentrated complex, conveniently may be filtered out.

A preferred method for separating a hydrogen bonding agent-silicic acid complex from excess water according to a process of this invention comprises salting out the complex as a phase separate from the water-containing phase. Salting out methods have previously been employed in the art for such purposes as removing dyes from solutions during the course of their manufacture. The technique comprises adding a suitable non-reactive salt to the solution in such proportions that the solution becomes saturated or nearly saturated with the salt.

The amount of a salt added to a silicic acid sol containing a hydrogen bonder according to this invention should be sufficient to cause the silicic acid-hydrogen bonder complex to form as a separate phase. Ordinarily a substantial concentration of the salt is used although this may vary with such factors as the concentration of the silicic acid and the choice of hydrogen bonder, but in any event the concentration of salt should be considerably more than is achieved, for instance, by neutralizing a sodium silicate solution with an acid. Ordinarily it will be preferred to saturate the water present with the salt.

The material used to effect salting out in the present processes should of course be chemically non-reactive with the hydrogen bonding donor compound or the silicic acid. The particular salt chosen should be used at such a pH that the corresponding metal silicate is not formed. Ordinarily such metal silicates will not form below pH 2.0. Fluorides operate as salting-out agents but simultaneously accelerate the gelling of silicic acid sols and their use is therefore avoided. While a variety of salts may be used, such as potassium chloride, potassium sulfate, potassium bromide, calcium chloride, zinc chloride, magnesium sulfate, magnesium chloride, copper sulfate, ammonium chloride, ammonium sulfate, barium chloride, sodium nitrate, sodium sulfamate, ferrous sulfate, and ferric chloride, it is preferred to use sodium chloride or sodium sulfate because of their low cost and non-reactivity with silicic acid and hydrogen bonding donor compounds.

The complexes of silicic acid and hydrogen bonders separated out according to this invention are liquids of novel character. They contain a minor proportion, by weight, of water, the proportion of water to silicic acid being less than that heretofore known in silicic acid sols. It is preferred that this minor proportion of water should be not more than a relatively small fraction of the total weight of the sol, usually being less than from one tenth to one fifth of the total. Most desirably, the sols should be substantially free of uncombined water, and to accomplish this condition they may be dried, as, for instance, by means of desiccants.

The sols have a chemical stability as sols much greater than that of silicic acid sols prepared according to methods heretofore available. They may be diluted with suitable materials, preferably of the hydroxylated type, such as primary alcohols, including methanol, ethanol, and normal butanol, and such dilution may serve to improve the stability of the sols during extended storage periods.

Silicic acid sols containing hydrogen bonding donor compounds which have been separated out according to processes of the present invention may be used for various of the purposes for which sodium silicate and silicic acid sols and gels have heretofore been used. Silicic acid sols prepared according to the present invention may be used with particular advantage in tanning. In addition to their use for tanning skins the sols may be employed for tanning any protein and thus may be used, for instance, for tanning or precipitation of gelatin for the preparation of photographic films and similar films using gelatin coatings. The sols may be found suitable for use in textile treatments and they may be used for treating wool as a dye substantive. They may be used for the treatment of cotton fibers, silk, rayon, or nylon for weighting, sizing, and stiffening. Sols prepared according to the present invention may also find application in the preparation of paper, and they may be used in the pulp to increase the wet strength, and they may be used for filling and stiffening the paper product. In such use they may of course be supplemented by aluminum, calcium or magnesium salts and by latex, paraffin, and other similar materials customarily used in the art. The sols may be used as rubber fillers being precipitated, for instance, with calcium chloride or magnesium chloride. The silica sols may similarly be used with plastics and resins as fillers or as coating agents and they may be used in combination with film-forming compositions to assist and modify them.

Silica sols prepared according to this invention may similarly find application in fireproofing and the like and they may advantageously be used with complex amine derivatives as fire retardants. They may be used in coating and paint compositions together with clay, pigments, or other paint ingredients in customary fashion. They are particularly adapted for use in paints containing protein because the film upon drying becomes insolubilized and the protein is tanned.

Silica sols prepared according to the present invention may be used for coating metals, particularly such metals as magnesium and aluminum. They may be used as emulsifying agents; they may be used for the treatment of glass fibres for a matting and as a dye substantive. They may be baked on glass to activate the surface and for coating. The silica sols may be used as adhesives and cements. They may be used as a binding agent for rock wool. For such uses they may advantageously be combined with other metals.

The silica gels prepared by gelling of the silicic acid sols prepared according to this invention may be dried as a catalyst support and may be employed for other purposes for which silica gels are used in the art.

The practice of the invention may be better understood by reference to the following illustrative examples:

*Example I*

A silicic acid sol was first prepared in the following manner: Sodium silicate solution containing 3.26 parts of silica per part of $Na_2O$ by weight and having a specific gravity of 1.372 (42.5° Bé.) was diluted with water until the solution contained 9.8% by weight of $SiO_2$. There was then added 494 parts of this silicate solution to 374 parts by weight of a solution of sulfuric acid containing 7.39 parts of $H_2SO_4$ per 100 parts of solution by weight. The acid solution was agitated violently during the addition of the silicate, and the silicate was added as a small stream. The resulting silicic acid sol had a pH of 2.0 and contained 60 grams of $SiO_2$ per liter, that is, 5.55 parts by weight of $SiO_2$ per 100 parts of the final aqueous solution. This sol was aged one hour before use, in the following examples, except as otherwise noted hereinafter.

To 1200 parts by weight of this silicic acid sol there was added 100 parts by weight of "diethyl Carbitol," the diethyl ether of diethylene glycol. A silicic acid-hydrogen bonding agent complex was then caused to separate by adding 360 parts by weight of sodium chloride with vigorous stirring. Upon centrifuging the solution, about 120 parts of a viscous liquid layer heavier than the rest of the liquid was collected. This viscous layer was drawn off from the supernatant liquid and upon analysis was found to contain substantially all of the silica originally added as sodium silicate and also the major portion of the hydrogen bonding agent originally added. The viscous liquid was miscible with such water-miscible liquids as methanol and ethanol, the 120 parts of liquid obtained giving a clear solution when diluted with 350 parts of methanol.

*Example II*

To 200 parts by weight of a silicic acid solution prepared as described in Example I there was added 30 parts of an ethylene oxide polymer, having the general formula $$HOC_2H_4O(C_2H_4O)_x \cdot C_2H_4OH$$

and an average molecular weight of about 4000 (commercially known as "Carbowax 4000") dissolved in an equal part of water. A complex of silicic acid and hydrogen bonding agent was then caused to separate out from the excess water by adding 73 parts of sodium chloride. Upon centrifuging, about 36 parts of a heavy translucent fluid was found to be separated as a separate liquid phase which was then decanted off from the supernatant liquid. This heavy liquid phase contained over 90 per cent of all the silica in the mixture. It was partially soluble in acetone and soluble in ethanol, isopropanol, glycerol, ethylene glycol and water. It contained about 28% by weight of SiO₂. It was fluid after standing for three days at room temperature.

*Example III*

To 1000 parts of silicic acid solution prepared as described in Example I there was added 80 parts of the dimethyl ether of tetraethylene glycol and the complex of the silicic acid and ether was caused to separate out by adding 300 parts of sodium chloride to the mixture with vigorous stirring. The mixture was then centrifuged and about 70 parts of a heavy viscous liquid layer collected at the bottom of the vessel. This layer was separated mechanically from the upper aqueous phase. It was diluted with 300 parts of ethanol of 95% strength. The layer was found to contain most of the silica originally added.

*Example IV*

To 800 parts by weight of silicic acid solution prepared as described in Example I which had been permitted to age for two hours at about 25° C. there was added 60 parts of the hydrogen bonding agent hexaethylene glycol

(HO(C₂H₄O)₆H)

A separate liquid phase comprising a complex of the silicic acid and hydrogen bonding donor compound was caused to form by adding 240 parts of sodium chloride to the mixture with stirring. By centrifuging the entire mixture this separate liquid phase was obtained as 36 parts of a heavy viscous layer. This layer was recovered by decanting off the supernatant liquid. By diluting this heavy viscous layer with 100 parts of ethanol there was obtained an alcoholic solution containing approximately 15% by weight of SiO₂ in the form of low molecular weight silicic acid.

*Example V*

To 80 parts of silicic acid solution prepared as described in Example I there was added 16 parts of N-isobutyl-acetamide as a hydrogen bonder and 24 parts of sodium chloride. The mixture was stirred for about 5 minutes and centrifuged. An upper liquid layer formed containing 75% of all the silica in the mixture and most of the isobutylacetamide.

*Example VI*

To 100 parts of silicic acid solution prepared as described in Example I there was added 30 parts of soduim chloride and 10 parts of "butyl Carbitol" (monobutylether of diethylene glycol). Upon centrifuging the mixture, 12.5 parts of a heavy liquid formed at the bottom of the container. This rather viscous heavy liquid contained 81% of the silica in the original solution. This liquid complex of hydrogen bonder and unpolymerized silicic acid in a highly concentrated form was much more stable than an aqueous solution of silicic acid in the same concentration. This technique, therefore, makes it feasible to recover silicic acid from an aqueous solution in a highly concentrated state for use in many the applications herein described.

*Example VII*

To 500 parts of a silicic acid solution prepared as described in Example I and aged about two hours there was added 45 parts tetraethylurea and 155 parts of sodium chlori to salt out the silicic acid-hydrogen bonder co plex. The mixture was stirred for five minu and then centrifuged. A layer lighter than t aqueous phase formed and collected at the up part of the solution. Forty-three parts of t liquid layer was recovered and to it was add 12.5 parts of 95% ethanol. The resulting sol tion was analyzed and found to contain 21.4 SiO₂ by weight. The liquid complex was solu in alcohol and in excess tetraethylurea.

*Example VIII*

To 200 parts of silicic acid sol prepared in Example I there was added 100 cc. of acet and 60 grams of sodium chloride and the m ture was stirred well for 15 minutes. On star ing for 15 minutes there separated a 25 cc. lay largely acetone, containing about 12% SiO₂ the form of water-soluble silicic acid. This co plex was used to impregnate paper to increase wet strength and to impregnate cellulose acet with silicic acid on its surface.

*Example IX*

To 200 parts by volume of silicic acid sol p pared as in Example I there was added 20 pa by volume of diacetone alcohol. To this mixt was added 60 grams of sodium chloride and mixture was stirred five minutes. Upon cent fuging the mixture, there settled to the bott six parts by volume of a viscous layer contain about 50 grams of SiO₂ per 100 cc. or roug 50% silica in the form of soluble silicic a This viscous complex was diluted with an eq volume of alcohol and was used to strengthen per, impregnate stone, and stiffen fabric.

*Example X*

This example illustrates the preparation silicic acid sol from ethyl silicate, in conjunct with a salting-out process of this invention.

Two hundred ten parts by weight of ethyl s cate was added to about 900 parts of water c taining 4.4 parts by weight of Na₂SO₄ and su cient H₂SO₄ to reduce the pH to 1.5.

The mixture was stirred for 24 hours and tl vacuum distilled at less than 30° C. until s stantially all the alcohol was removed, the v ume being maintained by the addition of wa This removal of alcohol was carried out as r idly as possible, requiring a period of about hour.

This solution of silicic acid was used for preparation of complexes with certain of the l drogen bonding agents described above. Thus was used for the preparation of a silicic acid co plex with diethyl ether of diethylene glycol follows:

To 1000 parts of the silicic acid sol prepa from ethyl silicate was added 330 parts by wei of sodium chloride and 125 parts by weight of ethyl ether of diethylene glycol and the mixt stirred at first vigorously and then more slow to permit separation, for one hour. A layer c taining silicic acid and diethyl ether of dieth ene glycol separated out. This layer, after c trifuging and filtering, was a clear yellow fl containing from 35 to 45% SiO₂ in the form of soluble silicic acid.

This liquid was used for impregnating paper and fabric and for introducing silicic acid into such plastics as urea-formaldehyde and cellulose acetate.

While in the foregoing description of this invention there have been shown certain illustrative processes, it will be understood that one skilled in the art may readily separate out silicic acid containing a hydrogen bonding donor in various ways without departing from the spirit of my invention.

This application is a continuation in part of my application Ser. No. 396,564 filed June 4, 1941, issued August 28, 1945 as Patent No. 2,383,653.

I claim:

1. In a process for the preparation of a silicic acid sol the steps comprising mixing with agitation an aqueous silicic acid sol which does not exhibit evidence of gelling and an organic hydrogen bonding donor compound which contains at least one oxygen atom bonded to a carbon atom, is selected from the group consisting of ethers in which the carbon atoms attached to the ether oxygen are not attached to each other, amides, and ketones, is soluble in water to the extent of at least one half per cent by weight, and which does not form a precipitate with soluble silicic acid, dissolving in the mixture a salt chemically non-reactive with the hydrogen bonding donor compound or the silicic acid, the pH of the solution being such that the corresponding metal silicate is not formed, and thereby salting out the hydrogen bonding donor compound together with the silicic acid to form two liquid phases, one of which contains the material salted out and the other water and salt, and separating the silicic acid phase from the water and salt.

2. In a process for the preparation of a silicic acid sol the steps comprising mixing with agitation an aqueous silicic acid sol which does not exhibit evidence of gelling and an ether in which the carbon atoms attached to the ether oxygen are not attached to each other, which is soluble in water to the extent of at least one half per cent by weight and which does not form a precipitate with soluble silicic acid, dissolving in the mixture a salt chemically non-reactive with the ether or the silicic acid, the pH of the solution being such that the corresponding metal silicate is not formed, and thereby salting out the ether together with the silicic acid to form two liquid phases, one of which contains the material salted out and the other water and salt, and separating the silicic acid phase from the water and salt.

3. In a process for the preparation of a silicic acid sol the steps comprising adding a water-soluble silicate to an aqueous acid solution which contains an organic hydrogen bonding donor compound which contains at least one oxygen atom bonded to a carbon atom, is selected from the group consisting of ethers in which the carbon atoms attached to the ether oxygen are not attached to each other, amides, and ketones, is soluble in water to the extent of at least one half per cent by weight, and which does not form a precipitate with soluble silicic acid, to form a silicic acid sol and a salt of the acid, dissolving in the mixture a salt chemically non-reactive with the hydrogen bonding donor compound or the silicic acid, the pH of the solution being such that the corresponding metal silicate is not formed, and thereby salting out the hydrogen bonding donor compound and silicic acid sol to form two liquid phases one of which contains the material salted out and the other excess water and salt impurities and separating the silicic acid phase from the excess water and impurities.

4. In a process for the preparation of a silicic acid sol the steps comprising mixing with agitation an aqueous silicic acid sol which does not exhibit evidence of gelling and an amide which contains at least one oxygen atom bonded to a carbon atom, is soluble in water to the extent of at least one half per cent by weight, and which does not form a precipitate with soluble silicic acid, dissolving in the mixture a salt chemically non-reactive with the amide or the silicic acid, the pH of the solution being such that the corresponding metal silicate is not formed, and thereby salting out the amide together with the silicic acid to form two liquid phases, one of which contains the material salted out and the other water and salt, and separating the silicic acid phase from the water and salt.

5. In a process for the preparation of a silicic acid sol the steps comprising mixing with agitation an aqueous silicic acid sol which does not exhibit evidence of gelling and a ketone which is soluble in water to the extent of at least one half per cent by weight, and which does not form a precipitate with soluble silicic acid, dissolving in the mixture a salt chemically non-reactive with the ketone or the silicic acid, the pH of the solution being such that the corresponding metal silicate is not formed, and thereby salting out the ketone together with the silicic acid to form two liquid phases, one of which contains the material salted out and the other water and salt, and separating the silicic acid phase from the water and salt.

JOSEPH S. KIRK.